United States Patent [19]

Hasegawa

[11] Patent Number: 5,463,891
[45] Date of Patent: Nov. 7, 1995

[54] METHOD FOR PRODUCING RATCHET DEVICES

[75] Inventor: Isao Hasegawa, Nara, Japan

[73] Assignees: Kabushiki Kaisha Hasegawa Seiko, Osaka; Maruei Kogyo Kabushiki Kaisha, Aichi, both of Japan

[21] Appl. No.: 240,361

[22] Filed: May 10, 1994

[51] Int. Cl.⁶ .................................................. B21D 53/28
[52] U.S. Cl. .............................. 72/340; 72/356; 72/377; 72/379.2; 29/893.33
[58] Field of Search ............................ 72/335, 348, 377, 72/379.2, 340, 356; 29/893.33, 893.34, 893.3

[56] References Cited

U.S. PATENT DOCUMENTS

| | | | |
|---|---|---|---|
| 2,639,495 | 5/1953 | Voslamber | 72/377 |
| 2,654,944 | 10/1953 | Wilson | 29/893.34 |
| 4,275,924 | 6/1981 | Lehmann | 29/893.34 |

FOREIGN PATENT DOCUMENTS

| | | | |
|---|---|---|---|
| 712417 | 10/1941 | Germany | 72/379.2 |
| 197341 | 8/1990 | Japan | 29/893.34 |
| 9243 | 1/1992 | Japan | 29/893.34 |

Primary Examiner—Daniel C. Crane
Attorney, Agent, or Firm—Barnes & Thornburg

[57] ABSTRACT

A method for producing ratchet devices, the method including the steps of forming a circular recess in a blank metal plate by drawing, compressing the metal plate in a pair of dies so as to reduce the depth of the recess and thicken the side wall thereof, and forming ratchet teeth on and along the inner annular surface of the side wall of the recess.

2 Claims, 12 Drawing Sheets

METHOD FOR PRODUCING RATCHET DEVICES

FIELD OF THE INVENTION

The present invention relates to a method for forming a ratchet in a plate member which is used as ratchet devices which find a wide range of application. More particularly, the invention relates to a method for producing ratchet devices on a simplified process.

BACKGROUND OF THE INVENTION

Ratchet devices are one of the indispensable tools in machinery for controlling and regulating the motions of machine parts. A ratchet is provided in a base such as a metal plate, and used as a unit ratchet device. The known process of fabricating ratchet devices is as follows:

Ratchetgears and blank metal plates are separately prepared, and then they are assembled into ratchet devices.

However, the preparation and assembling of ratchets and base plate members prolong the production and increase the cost. Besides, the addition of a ratchet gear to the plate member increases the weight of the ratchet device.

SUMMARY OF THE INVENTION

The present invention is directed to simplify the process of fabricating component parts having ratchets.

According to the present invention, the method includes the steps of forming a circular recess in a blank metal plate by drawing, compressing the metal plate in a pair of dies so as to reduce the depth of the recess and thicken the side wall thereof, and forming ratchet teeth on and along the inner rim of the recess.

DETAILED DESCRIPTION OF THE PREFERRED EMBODIMENT

Figure 1:
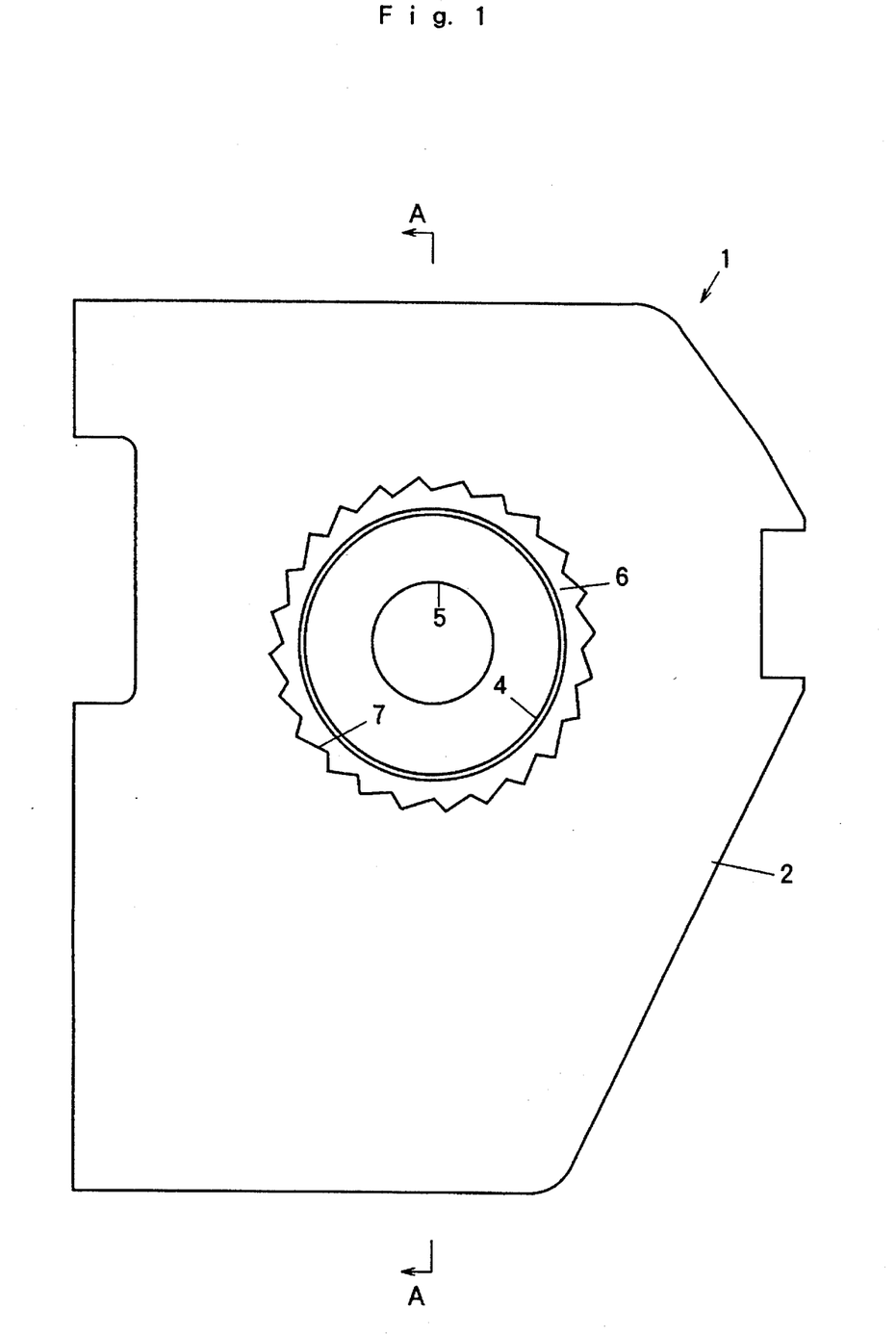
FIG. 1 is a front view showing a finish ratchet device fabricated according to the present invention.
Figure 2:
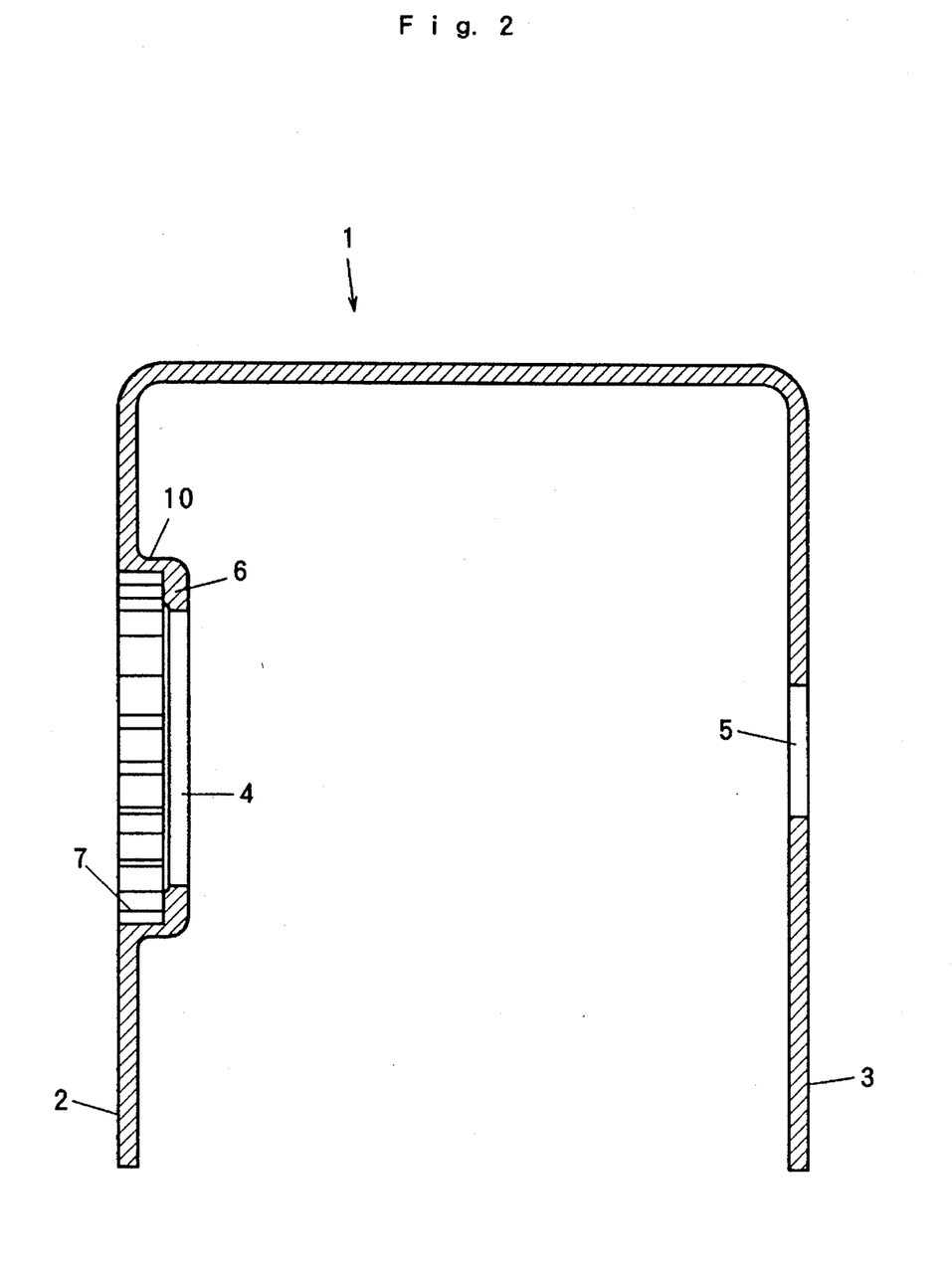
FIG. 2 is a cross-sectional view of the ratchet device taken along the line A—A in FIG. 1.

Referring to FIGS. 1 and 2, which shows a finished ratchet device having ratchet teeth 7, the invention will be described in detail:

The exemplary ratchet device 1 is made of metal plate bent to have a channel-like cross-section, and has a large aperture 4 in one side wall 2 and a small aperture 5 in the opposite side wall 3, the apertures 4 and 5 allowing a rachetgear shaft (not shown) to pass through. The side wall 2 includes a recess 6 in which the aperture 4 is produced and the ratchet teeth 7 are formed on and along the inner rim thereof coaxially with the aperture 4.

Figure 3:
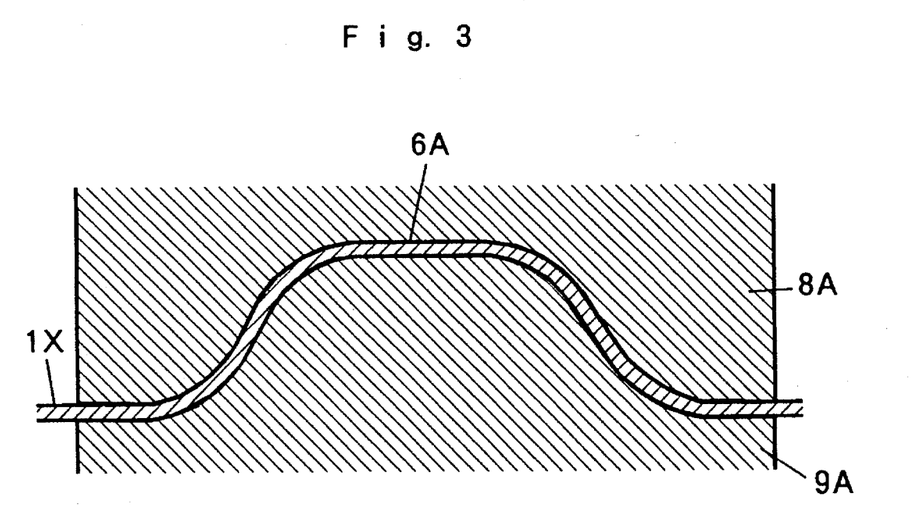
FIGS. 3 to 5 are cross-sectional views showing the process according to the present invention.
Figure 4:
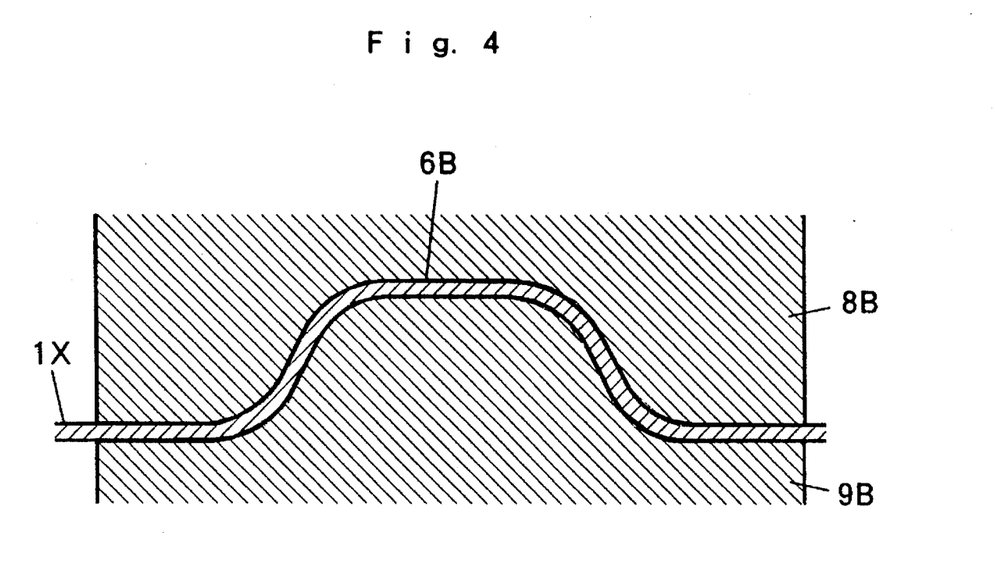
Figure 5:
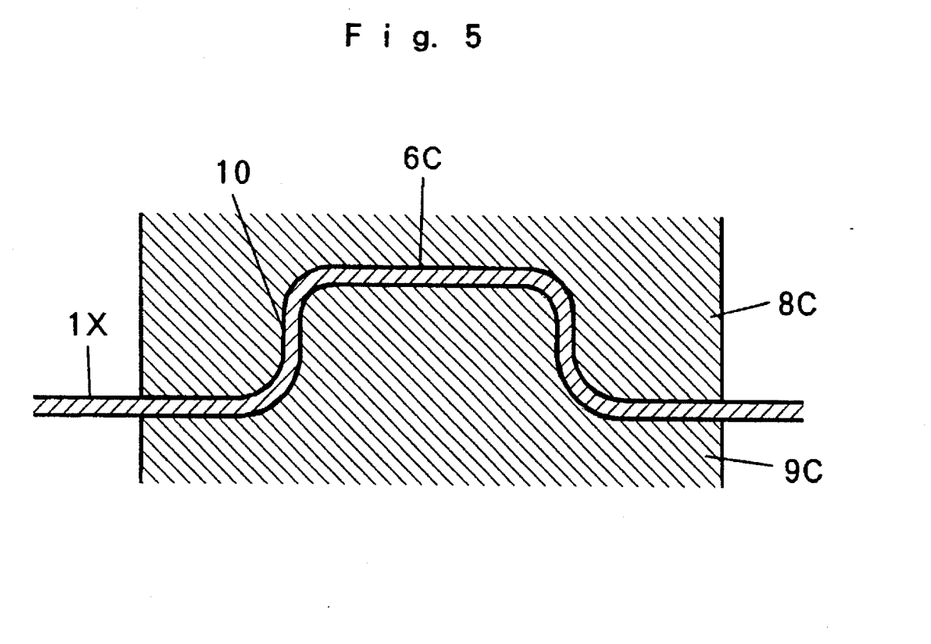
Figure 6:
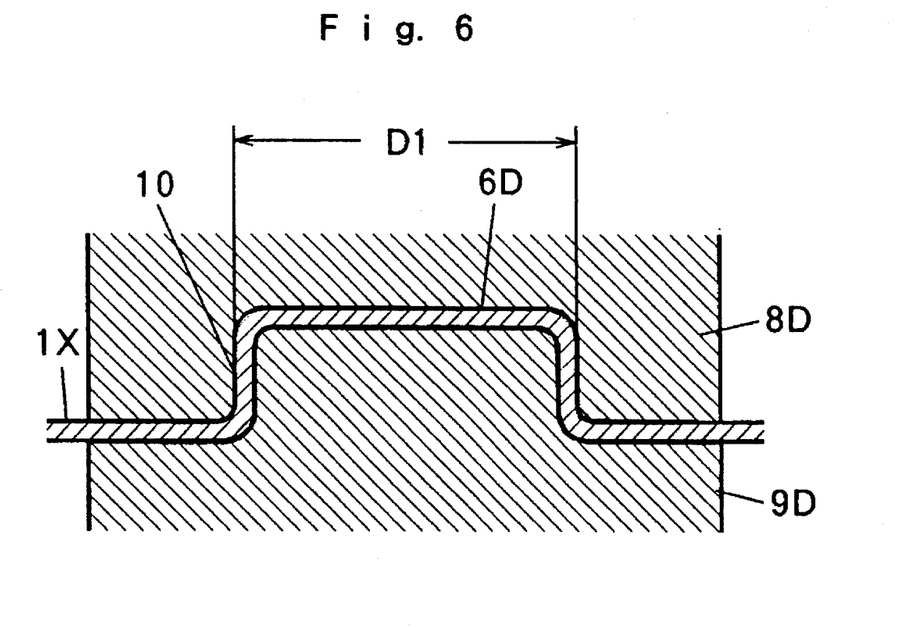
FIGS. 6 to 8 are cross-sectional views showing the compressing process step by step.

The recess 6 and ratchet teeth 7 are formed in a blank plate 1x cut to a desired size, which is as follows:

The blank plate 1x is compressed between dies 8A–9A, 8B–9B, and 8C–9C, respectively, as shown in FIGS. 3 to 5 so that it may have a gradually sided or round recess 6A in FIG. 3, and by using the dies 8B and 9B the recess 6A is compressed into a recess 6B in FIG. 4. Then, by using the dies 8C and 9C, the recess 6B is further compressed into a recess 6C having a side wall 10 virtually upright with respect to the surface of the plate 1x.

Figure 7:
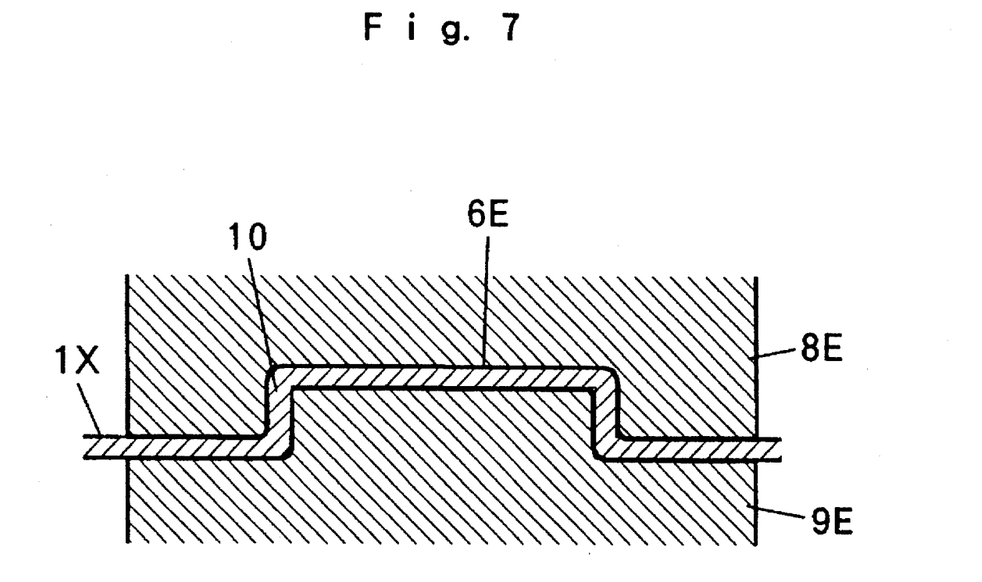
Figure 8:
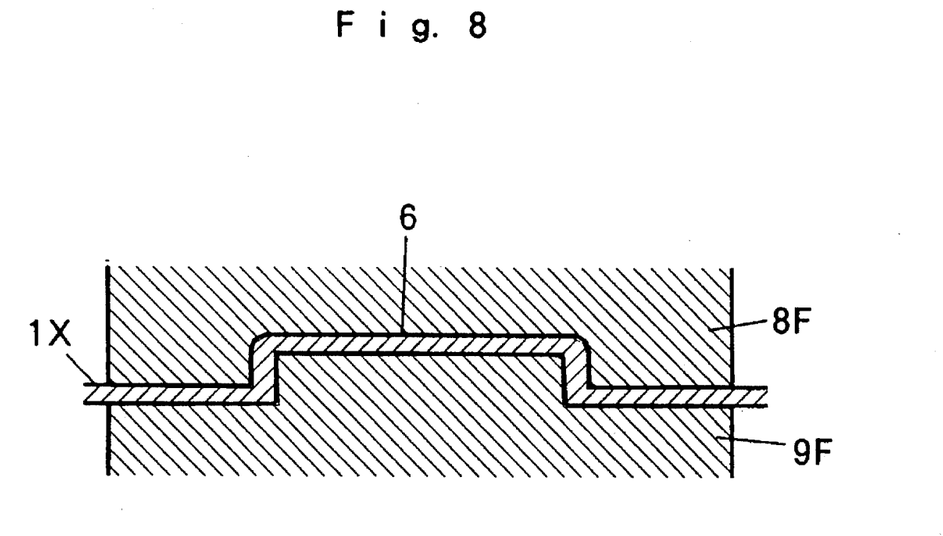
Figure 9:
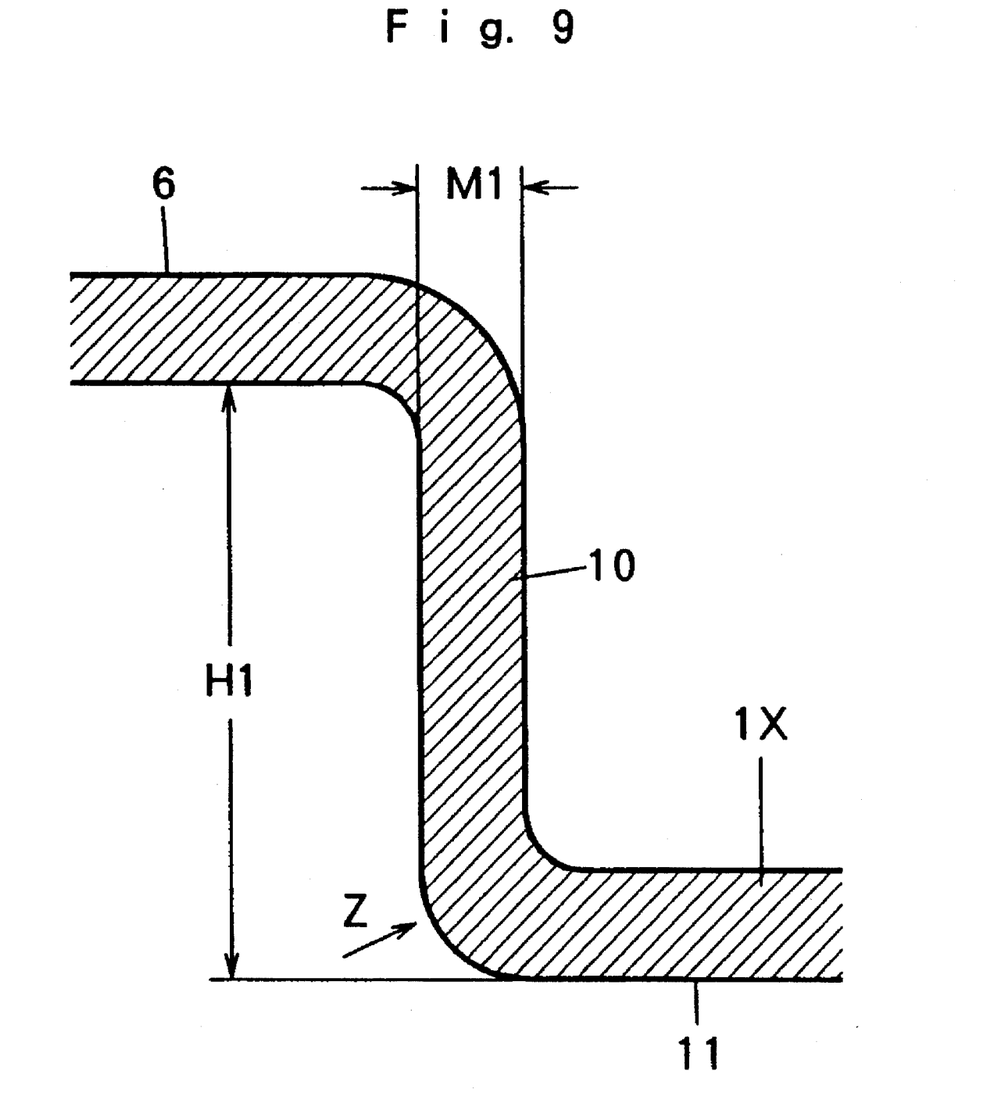
FIGS. 9 to 11 are enlarged segmentary cross-sectional views of FIGS. 6, 7 and 8, respectively.
Figure 10:
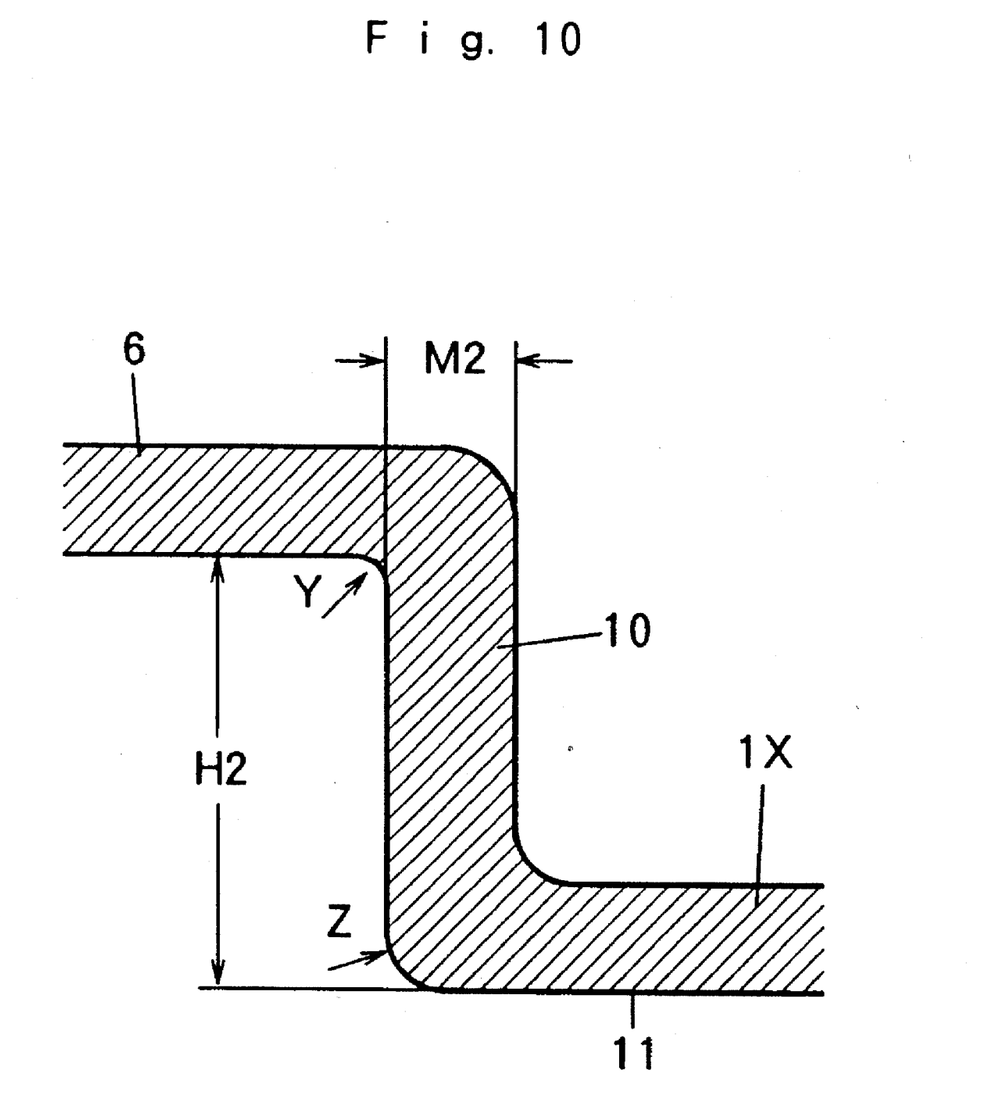

Subsequently, the recess 6c is further compressed into a recess 6D having an outside diameter of D1 by using dies 8D and 9D. This diameter D1 is maintained throughout the subsequent processes. At the step shown in FIG. 7 dies 8E and 9E are used to compress the recess 6D into a recess 6E without changing the diameter D1, and finally the recess 6 is obtained as shown in FIG. 8 by using dies 8F and 9F. The recess 6 has a depth of H1 (FIG. 9), and is further compressed until the depth is reduced as indicated by H2 (FIG. 10). Simultaneously, the thickness of the side wall 10 becomes thicker from M1 (FIG. 9) to M2 (FIG. 10), and the curvatures of the corners Y and Z (FIGS. 9 and 10) become smaller. The reduction in curvature is effected by selecting the dies 8D, 8E, 9D and 9E so that the desired curvatures may be achieved. At the final step shown in FIG. 11 the depth of the recess 6 is finally made H3 which is shallower than H2, and the thickness of the side wall 10 becomes thicker from M2 to M3. The curvature of the corner Z becomes 90° and that of the corner Y is also reduced.

Figure 11:
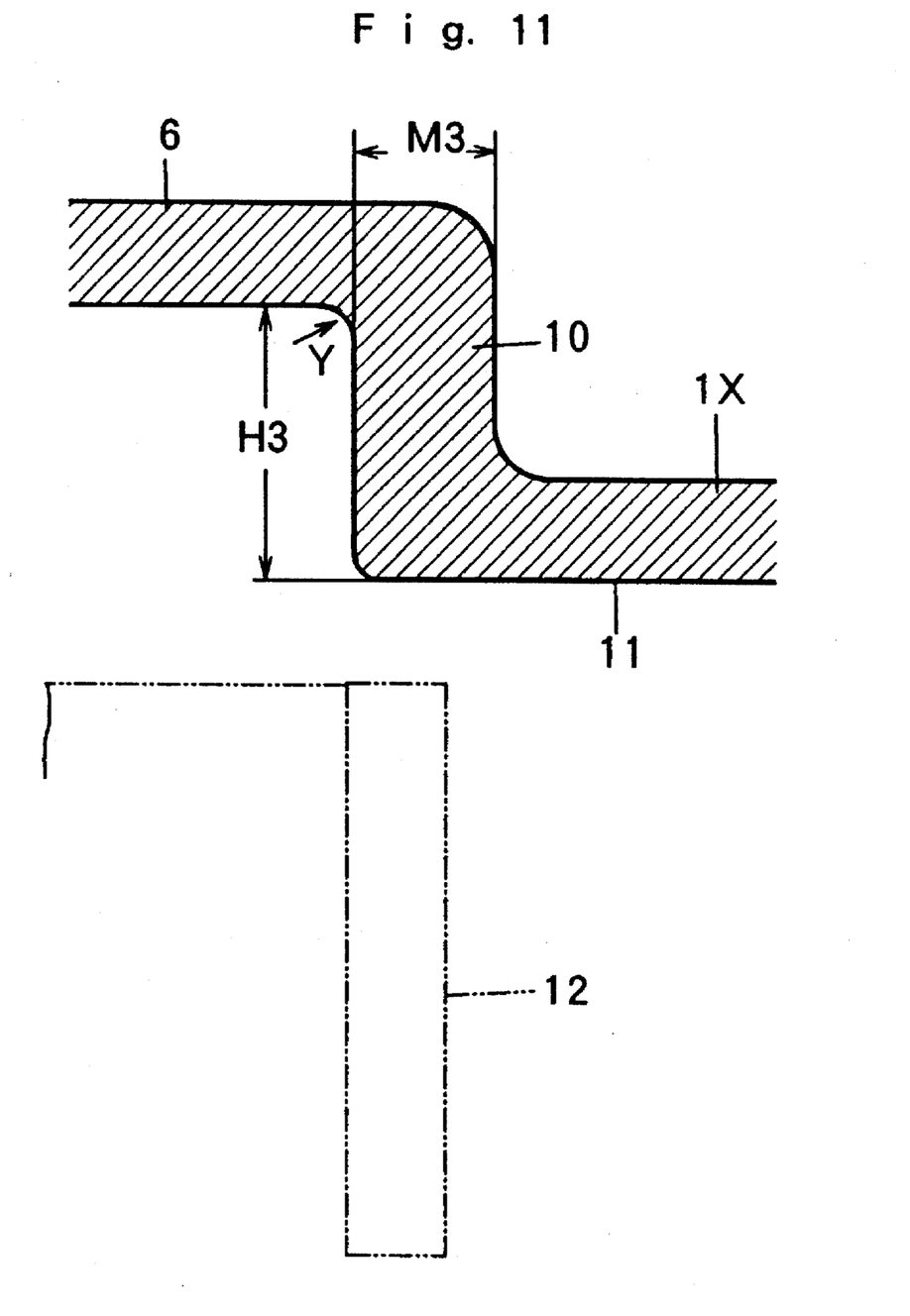
Figure 12:
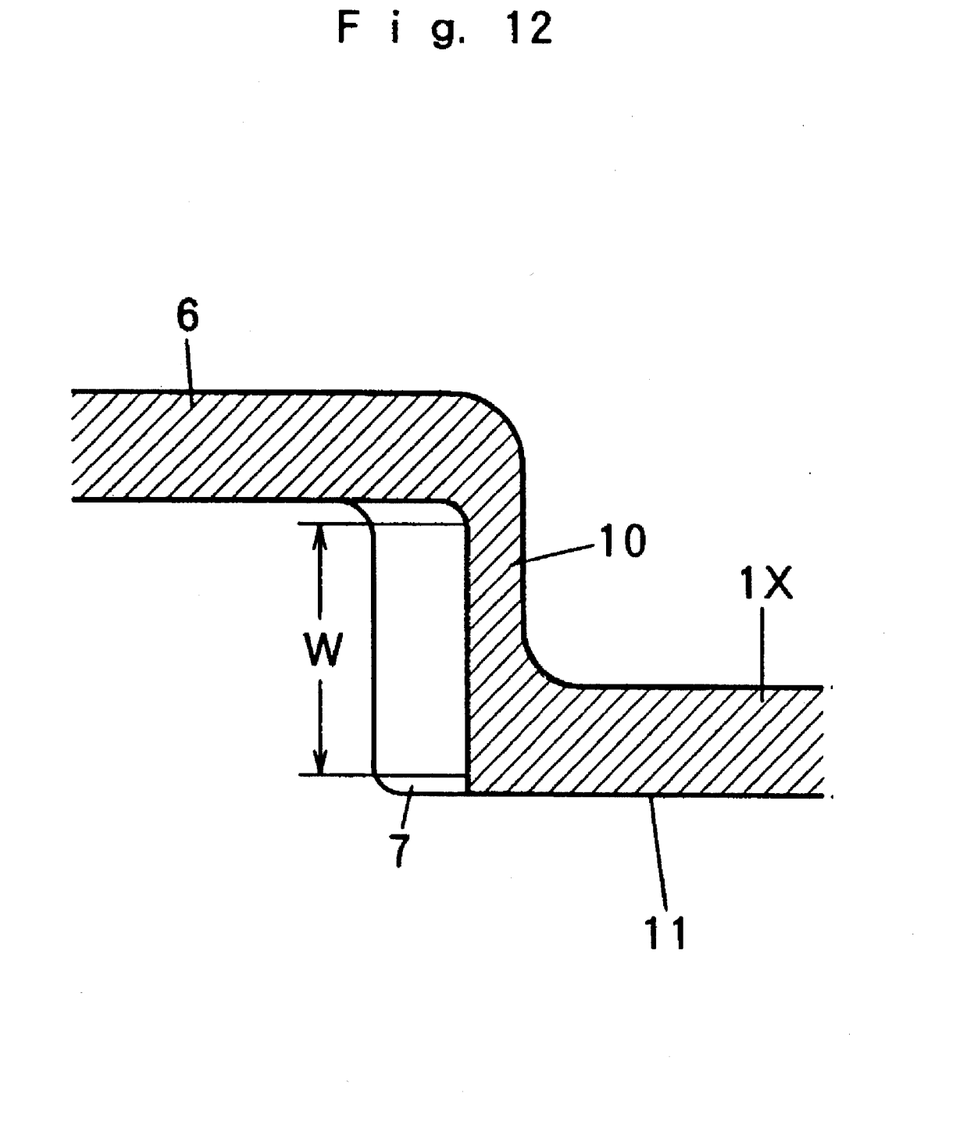
FIG. 12 is an enlarged segmentary cross-sectional view of a finished ratchet device.

Then, a ratchet forming tool 12 is brought into the recess 6 as shown in FIG. 11, and ratchet teeth 7 are formed on and along the inner rim of the recess 6 in the known manner as shown in FIG. 12. After the ratchet teeth 7 are formed, the apertures 4 and 5 are produced and the plate 1x is bent to a required shape. Alternatively, the plate 1x is bent and then the apertures 4 and 5 are produced.

According to the present invention, the ratchet teeth can be formed in a blank plate even when the plate is too thin to form ratchet teeth. Because of the acute corners Y, Z and the thick side wall 10 of the recess 6, the ratchet teeth can have a high rigidity in spite of using a thin body of the plate. Also, the acute corners Y and Z maximize the uniform thickness of the rachet teeth 7 as illustrated by the height W in FIG. 12.

What is claimed is:

1. A method for producing ratchet devices, the method comprising the steps of forming a circular recess in a blank metal plate by drawing, the recess defined by a side wall and bottom wall with the side wall connected to the plate by a corner and the bottom wall connected to the side wall by a corner, the depth of the recess measured between a surface of the plate and the bottom wall, compressing the metal plate sequentially in a plurality of pairs of dies so as to reduce the depth of the recess, thicken the side wall of the recess and reduce the curvature of each corner of the recess in a plurality of compression step, and subsequentially forming ratchet teeth on and along the inner rim of the recess.

2. The method according to claim 1, wherein the step of compressing the recess includes six compression steps each using a different pair of dies which reduces the depth of the recess, increases the thickness of said recess or reduces the curvature of each corner of the recess an additional amount than the previous pair of dies.

\* \* \* \* \*